US006343615B1

(12) United States Patent
Miller et al.

(10) Patent No.: US 6,343,615 B1
(45) Date of Patent: *Feb. 5, 2002

(54) BUTTERFLY VALVE

(75) Inventors: David L. Miller, Conshohocken; Frank A. Sclafani, Jr., Jeffersonville, both of PA (US); Paul R. Wentz, Sicklerville, NJ (US); Paul D. Carpenter, West Chester, PA (US)

(73) Assignee: Hale Products, Inc., Conshohocken, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,727

(22) Filed: Oct. 29, 1998

Related U.S. Application Data

(63) Continuation of application No. 08/376,811, filed on Jan. 23, 1995, now abandoned.

(51) Int. Cl.[7] .......................... F16T 1/20; F16K 37/00; F16K 31/05; A62C 27/00

(52) U.S. Cl. ...................... 137/202; 137/354; 137/554; 137/881; 251/129.03; 251/129.12; 169/24

(58) Field of Search ................................ 137/202, 554, 137/899, 351, 354, 355, 881, 878, 877, 115.26; 251/96, 129.03, 129.12, 249.5; 169/24, 52; 417/296, 309

(56) References Cited

U.S. PATENT DOCUMENTS

| | | | | | |
|---|---|---|---|---|---|
| 2,013,260 | A | * | 9/1935 | Waterous | 137/354 |
| 2,327,980 | A | * | 8/1943 | Bryant | 251/96 X |
| 2,812,772 | A | * | 11/1957 | Moore | 137/202 |
| 2,989,988 | A | * | 6/1961 | Rudelick | 251/129.12 X |
| 3,011,754 | A | * | 12/1961 | Ander | 251/129.12 X |
| 4,050,857 | A | * | 9/1977 | Leach | 169/24 X |
| 4,120,319 | A | * | 10/1978 | Krechel et al. | 137/881 X |
| 4,556,194 | A | * | 12/1985 | Lingen | 251/129.12 |
| 4,848,398 | A | * | 7/1989 | Leach | 137/881 X |
| 5,269,343 | A | * | 12/1993 | Trapp | 137/554 |

OTHER PUBLICATIONS

"Fire Truck Pump Inlet Valve", Gyorgy Korenyi–Both, David L. Miller & Paul R. Wentz, Senior Project Number MEM–28, Jun. 28, 1993.*

* cited by examiner

*Primary Examiner*—John Rivell
(74) *Attorney, Agent, or Firm*—John F. A. Earley; John F. A. Earley, III; Harding, Earley, Follmer & Frailey

(57) ABSTRACT

A butterfly valve and associated controls for controlling the flow of water from a large diameter fire hose to the inlet of a fire pump is disclosed. The valve is installed between the suction tube and the suction tube extension of a midship mounted fire pump on a fire truck in a location such that the valve is positioned behind the pump operator panel. A pressure relief valve and an air bleed are mounted on the body of the valve.

44 Claims, 9 Drawing Sheets

BUTTERFLY VALVE

This is a continuation of application Ser. No. 08/376,811 filed on Jan. 23, 1995, now abandoned.

BACKGROUND OF THE INVENTION

1. Field of the Invention

This invention relates generally to butterfly valves and, more particularly, to a butterfly valve and associated controls for use as an inlet valve for a fire truck pump used in firefighting applications.

2. Description of the Prior Art

At a fire scene, it is desirable to place the fire truck with its equipment as close to the fire as practical and to begin the firefighting operation as soon as possible by delivering water onto the fire from the fire truck's on-board water tank. At the same time, a large diameter hose is run to the nearest available hydrant or pressurized water supply and one end thereof is connected thereto, the other end of this hose being connected to the inlet connection for the pump on the fire truck. This procedure requires the provision of a valve on the inlet of the fire truck pump constructed and arranged for use in a firefighting operation whereby the fire pump can be placed in operation with water supplied from the truck's on-board water tank while the large diameter hose is being run to and connected to the nearest hydrant or pressurized water supply. Once the hydrant is opened and the large diameter hose is charged with water, the inlet valve is opened and the tank valve is closed so that the fire pump is supplied with water from the hydrant.

The term "large diameter hose" is used in the art to designate a fire hose having a diameter of at least 3.5 inches, and, more typically, about 5 to 6 inches.

The presently available valves of the above type being used as fire truck pump inlet valves are mainly "after market" units that are installed by the fire department. These valves are long and extend outside the body work of the truck and can interfere with the normal operation of the fire pump. Also, the general overall design of these valves is such that they are unacceptable by fire truck manufacturers to be considered as a built-in component. These valves are available with only one form of actuation, usually manual, and cannot be adapted easily to another form of actuation. Another problem with these valves that makes them unacceptable as built-in units is the fact that they do not meet NFPA (National Fire Protection Association) criteria for pump performance during draft operations.

There are essentially four of the above-discussed type of inlet valves for fire truck pumps that make up the majority of the present-day market. These valves are the ANGUS HI-VOL GATE VALVE, the HARRINGTON/AWG PISTON INTAKE RELIEF VALVE, SNAP-TITE PISTON INTAKE VALVE, and the HARRINGTON/AWG BALL INTAKE RELIEF VALVE. None of these valves is of the butterfly-type valve construction.

Hale Fire Pump Company manufactures a butterfly valve for use as an inlet valve for a fire truck pump, this valve being known as the "Hale type 60WP Series butterfly valve". However, this valve is not designed for use with large diameter hoses. This valve, which is mounted behind the operator panel, has a butterfly type valve member and is actuated by means of an air cylinder which is operable to move the valve between only two flow control positions, i.e., a fully opened and a fully closed position.

SUMMARY OF THE INVENTION

It is the general object of the invention to provide an improved butterfly valve and associated controls for use in controlling the flow of water through a large diameter fire hose to the inlet of a fire truck pump, such as a midship pump.

One improved feature of the valve in accordance with the invention is that it is constructed and arranged to provide for a safer operation. The butterfly valve in accordance with the invention is installed between the suction tube and the suction tube extension on a midship mounted pump of a fire truck in a location such that the valve is positioned behind the pump operator panel. With the prior art valves, the inlet valve for the large diameter hose is positioned to extend beyond the pump operator panel at a location where the operator usually stands during a firefighting operation whereby the operator is susceptible to injury in the event that the valve should be blown apart by the action of the high pressure water supplied thereto. With a large diameter hose, typically five or six inches in diameter, the slug of water that comes down the hose at a rate of 1,500 gallons per minute, or the like, can cause the structural failure of the inlet valve. There have been actual cases of serious injury to firefighters by this circumstance. By locating the butterfly valve in accordance with the invention behind the operator panel, if a structural failure of the valve should occur, the operator is provided with some degree of protection by the panel which is interposed between the failed valve and the operator. In this regard, a pressure relief valve is mounted on the valve body and behind the operator panel.

Another safety feature provided by the valve in accordance with the invention is that it is designed to be suitable for remote control. To this end, the operation of a valve member, as well as the operation of an air bleeder, can be controlled from a safe remote location. If the valve should fail structurally because of the water pressure exceeding the capability of the valve, the compressed air in the system will expand creating an additional threat to injury of the operator. However, by positioning all of the controls so that the operator will be standing at a remote or protected location, the operator is in a much safer position.

Another feature of the invention is to provide a butterfly valve design whereby the disk and the body of the valve are constructed to exceed the 500 PSIG hydrostatic pressure requirement of the National Fire Protection Association. By reason of this design, the valve disk and valve chamber are constructed to be larger than the prior valves, which are rated to have only a sealing ability at about 250 PSIG.

Another feature of the butterfly valve design in accordance with the invention is that it is designed to provide a minimum obstruction to flow to thereby achieve the least pressure drop as the water enters the pump. The National Fire Protection Association requires a flow rate of up to 1,500 gallons per minute in order to get all the fluid through a single suction connection from a 10 foot lift through 20 feet of hose. None of the prior art valves can achieve this whereas this is achieved by the butterfly valve design in accordance with the invention, which valve is considered full flow up to 1,500 gallons per minute.

Another feature of the invention is to provide an improved air bleed means. There is disclosed a manual air bleed construction as well as a novel automatic air bleed design.

Another feature of the invention is the provision of the valve of the indicated type which has two modes of actuation, namely, a manual actuation means as well as a power operated actuation means. More specifically, the power operated means utilizes an electric motor which actuates the butterfly valve disk to a desired flow control position. The manual actuation means is operable as a manual override to permit operation under emergency or abnormal operating conditions whereby the electric motor is not usable.

Another feature of the valve in accordance with the invention is the provision of electrical means for indicating the position of the valve disk. This means is operable to indicate whether the valve is closed, open, or at some in-between location, such as when it is traversing between the closed and open positions.

Another feature of the invention is the provision of a clutchable handwheel means for use with the manual actuating means for the valve.

Another feature of the invention is that the motor actuation of the valve disk is designed to operate through a predetermined time delay period as it moves the valve between closed and open positions. This serves as another safety feature for the inlet valve by causing the valve disk to open or close gradually.

DETAILED DESCRIPTION OF THE PREFERRED EMBODIMENT

Figure 1:
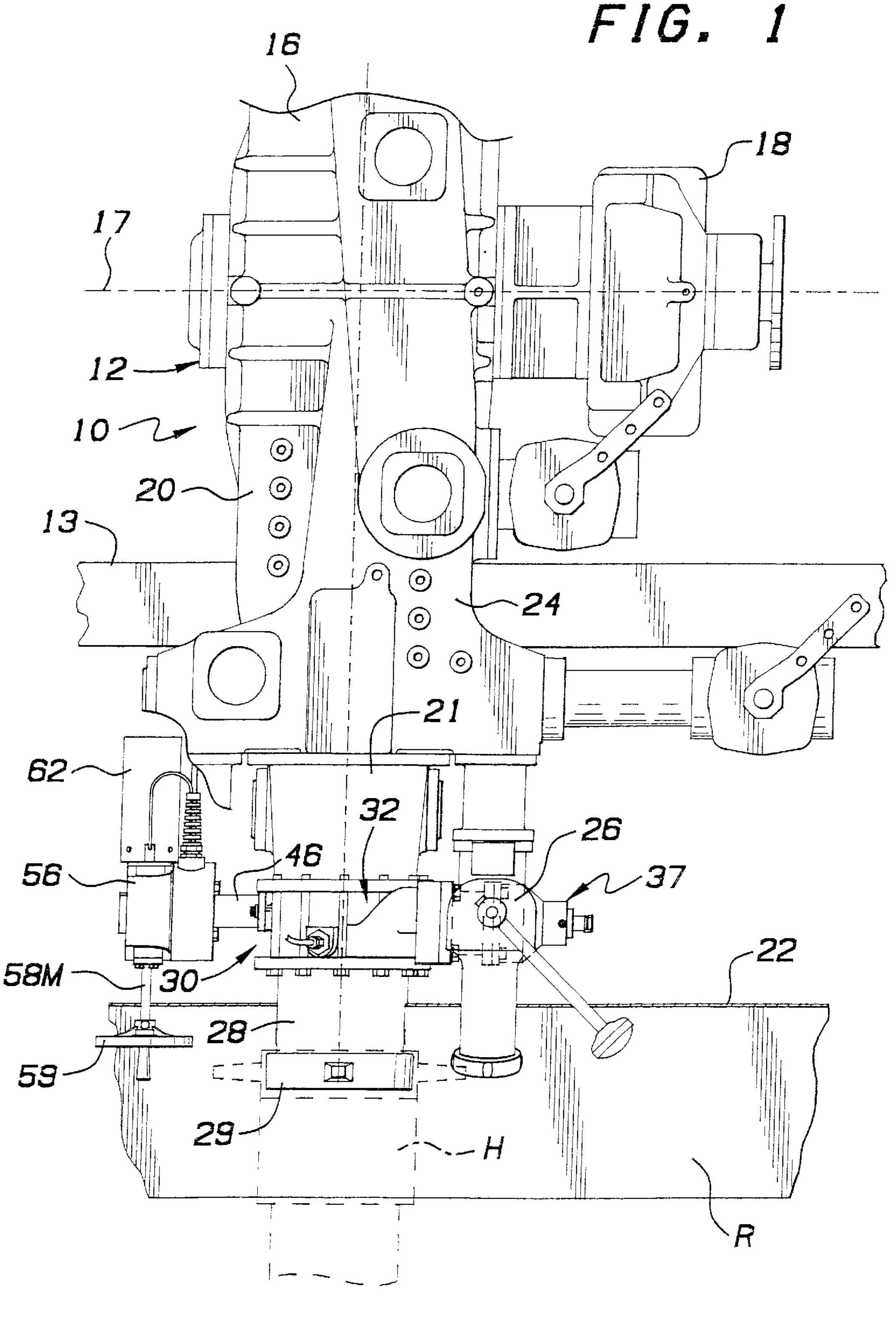
FIG. 1 is a fragmentary plan view of a conventional midship fire pump provided with the inlet valve and associated controls in accordance with the invention.

In FIG. 1, there is shown part of a conventional midship fire pump, which is of a type manufactured by Hale Fire Pump Company and comprises a pump assembly 10 including a centrifugal pump 12 of a size and design to mount on the chassis rails 13 of a conventional fire truck chassis. Pump 12 comprises a cast main pump body 16 and an impeller mounted on a impeller shaft rotatably supported in the pump body 16 and extending along the longitudinal axis 17 of the truck chassis. Pump 12 is driven by a drive line from the truck transmission which is engageable with a pump transmission 18. Pump body 16 is provided, at a lower position, with a body portion 20 defining a pair of suction passages extending between the suction of the impeller of pump 12 and both sides of the fire truck whereat each suction passage is connected to a suction tube extension 21 located inwardly of the operator panel 22 provided on each side of the fire truck. Pump body 16 is also provided with an upper body portion 24 defining a discharge manifold extending across the upper portion of the pump 12 between the discharge of the pump impeller and both sides of the fire truck where the discharge flow is controlled at a plurality of locations by a plurality of discharge valves, such as discharge valve 26 shown in FIG. 1. A portion of a running board of the fire truck is shown at R in FIG. 1.

The above-described portion of the midship pump 10 is entirely conventional and is disclosed in numerous patents, such as, by way of example, U.S. Pat. Nos. 3,500,961 and 4,337,830.

In accordance with the invention, there is provided a novel inlet valve assembly, indicated generally at 30, for controlling the flow of water from a large diameter fire hose H to the suction of the fire pump 12. The flow is by way of the suction tube extension 21 of midship pump assembly 10 which receives the flow from a suction tube 28, which is, as is conventional in the art, arranged to extend outwardly of operator panel 22 for connection to a large diameter hose H by way of a conventional quick-connect connection 29 mounted on the outer end of suction tube 28.

Figure 2:
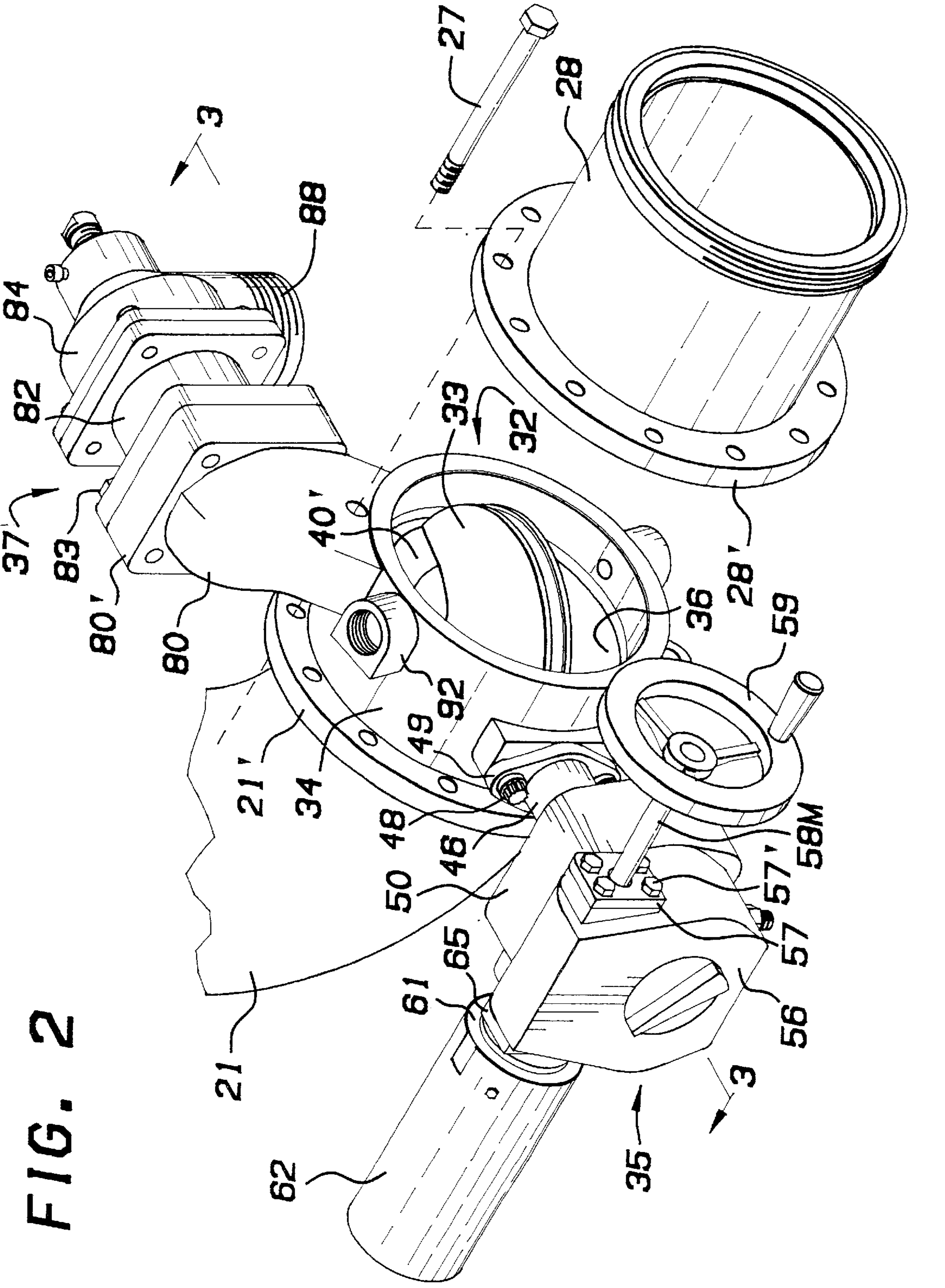
FIG. 2 is a perspective view showing the inlet valve in accordance with the invention and associated controls therefor.

Inlet valve assembly 30, as shown in FIG. 2, comprises a butterfly valve 32 including a disk-shaped valve member 33, an actuator means 35 for actuating the valve member 33 between its flow control positions, a pressure relief valve 37 for discharging water from the upstream end of butterfly valve 32 at a set pressure, an air bleed means 90 (FIG. 3) for bleeding air from the upstream end of butterfly valve 32 as desired, and controls associated with said aforementioned means.

Butterfly valve 32 comprises a valve body 34 sandwiched between suction tube extension 21 and suction tube 28 and having a generally cylindrical portion defining a cylindrical internal valve chamber 36, which extends between suction tube 28 and suction tube extension 21 to provide flow communication therebetween. Valve member 33 has a disk-shaped configuration as shown in the drawings and is mounted at diametrically opposed portions to rotate between a plurality of flow control positions, including a closed position (shown in FIGS. 3), a fully open position (shown in FIG. 2), and a plurality of partially open positions (one of which is shown by a slanted dashed line showing in FIG. 5).

Valve member 33 is mounted to rotate about a generally horizontally extending axis. The mounting means for valve member 33 comprises a trunnion-like arrangement comprising a first trunnion 40 mounted in valve body 34 to extend into a recessed bore 42 in valve member 33 to rotatably support one end of valve member 33 and a second trunnion 44 comprising a cylindrical extension of valve member 33 rotatably mounted in the end of a tubular portion 46 of a gearbox adapter 50, which is mounted on valve body 34 by two long mounting screws 48 which extend through holes in a flange 49 on portion 46 to threadedly engage valve body 34. Trunnions 40 and 44 are arranged in coaxial relationship with one another and with the centrally located axis of rotation of valve member 33. By this arrangement, valve member 33 is supported in trunnions 40 and 44 located at diametrically opposite ends of its central axis of rotation to support the valve member 33 for pivotal movement about said axis.

In accordance with a feature of the invention, there is provided an actuator means 35 which comprises two modes of actuation provided by a manual actuating means and a power-operated actuating means. To this end, actuating means 35 comprises an actuator shaft 52 rotatably contained within the interior of the tubular portion 46 of gearbox adapter 50. One end 52A of actuator shaft 52 is slotted to engage over a tab-shaped end of second trunnion 44 on valve member 33 for conjoint movement therewith. The other end 52B of actuator shaft 52 has a square-shaped configuration and is engaged within a square-shaped recess 54B in the center of a segment gear 54 rotatably mounted within a gearbox 56, which is secured onto gearbox adapter 50 by four long mounting screws 55. By this arrangement, as segment gear 54 rotates about its central axis (in response to the action of either a manual-operated means or a power-operated means to be described hereafter) such gear rotation is transmitted to the second trunnion 44 of valve member 33 by means of actuator shaft 52, whereby there is caused a corresponding rotation of valve member 33 about its axis of rotation.

Figure 4:
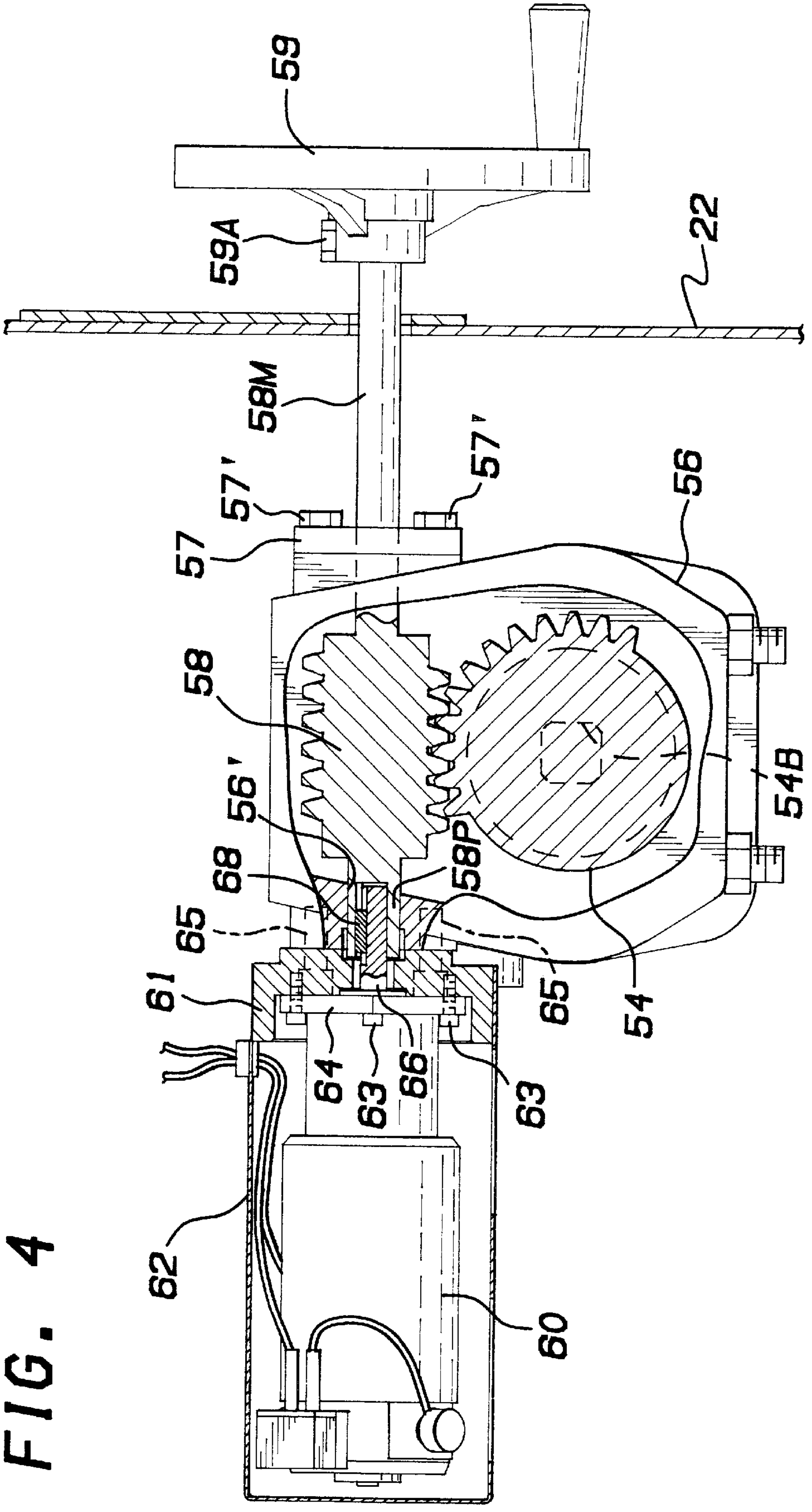
FIG. 4 is a section taken generally on line 4—4 of FIG. 3.

Gearbox 56 includes a worm gear 58 mounted for rotation on an axis that extends at a right angle to the axis of rotation of segment gear 54, which forms the worm wheel of the worm gear drive best shown in FIG. 4. Worm gear 58 and segment gear 54 provide a conventional worm gear set. Thus, gears 54 and 58 are mounted and arranged with the helical thread on worm gear 58 in engagement with the teeth on segment gear 54 in a conventional worm gear drive arrangement. Thus, as worm gear 58 is caused to rotate about its axis (by means of either a manual-operated means or a power-operated means as described hereafter) through a plurality of revolutions, segment gear 54 is caused to rotate a quarter turn (90°) about its axis of rotation, the rotation of the segment gear 54 being transmitted through actuator shaft 52 to the valve member 33 to move the same to a desired flow control position.

It is to be noted that valve actuator mechanisms including a construction similar to gearbox 56 and its contained worm gear 58 and segment gear 54 are commercially available. For example, one commercially available product that may be employed is the TYPE 98 Series available from GBE MASTERGEAR CORPORATION of Stanardsville, Va. This commercially available device is manually operable by the use of a handwheel which is connected to the worm gear, and comprises a valve stem engaging portion which is connected to a segment gear. This commercially available device is constructed for the manual actuation of small quarter turn valves.

Worm gear 58 is provided with a first shaft extension 58M which extends from the helical thread thereof through a bore in the housing of gearbox 56 and an aligned bore in a cover plate 57 mounted on one side of the housing of the gearbox 56 by four screws 57'. Shaft extension 58M extends through a hole in operator panel 22 to a location externally thereof whereat a manual handwheel 59 is mounted thereon and secured thereto by a set screw means 59A. Handwheel 59 is constructed and arranged to cause rotation of shaft extension 58M and worm gear 58 in response to a manual actuation (turning) thereof. Worm gear 58 is provided with a second shaft extension 58P extending from its helical thread along its axis in the opposite direction from shaft extension 58M to be rotatably mounted in a bore 56' in the housing of gearbox 56 as shown in FIG. 4. The outer end of shaft extension 58P projects from the housing of gearbox 56 to be received in a counterbore in the side wall of a gear motor adapter 61, which is secured onto gearbox 56 adjacent shaft extension 58P by means of four socket head mounting screws 65. Mounting screws 65 are arranged in a rectangular configuration and extend through holes in the side of gear motor adapter 61 to be threadedly received in threaded bores in the housing of gearbox 56, as is best shown in FIG. 4.

The power-operated actuator means comprises an electric motor 60 which is constructed and arranged to drive worm gear 58 by engagement with the shaft extension 58P. To this end, motor 60, which is contained within a cylindrical housing 62, is secured to gear motor adapter 61 by four mounting screws 63 which extend through holes in the corners of a square-shaped flange 64 at one end of motor 60 to threadedly engage corresponding threaded holes in gear motor adapter 61, as is best shown in FIG. 4. By this arrangement, motor 60 and its shaft 66 extend along the rotational axis of worm gear 58 in coaxial alignment with shaft extension 58P.

Means are provided for coupling the shaft 66 of motor 60 to the shaft extension 58P whereby the rotation of motor shaft 66 will cause a corresponding rotation of the worm gear 58 to thereby cause rotation of gear segment 54 and the movement of valve member 33 to a desired position. Such coupling means comprises coupling arrangement whereby the end of motor shaft 66 is received in an elongated axial bore in the end of shaft extension 58P. The portion of shaft 66 received within the axial bore of shaft extension 58P is arranged in driving engagement with the shaft extension 58P by means of a conventional key and keyway coupling means 68, as best shown in FIG. 4.

Figure 5:
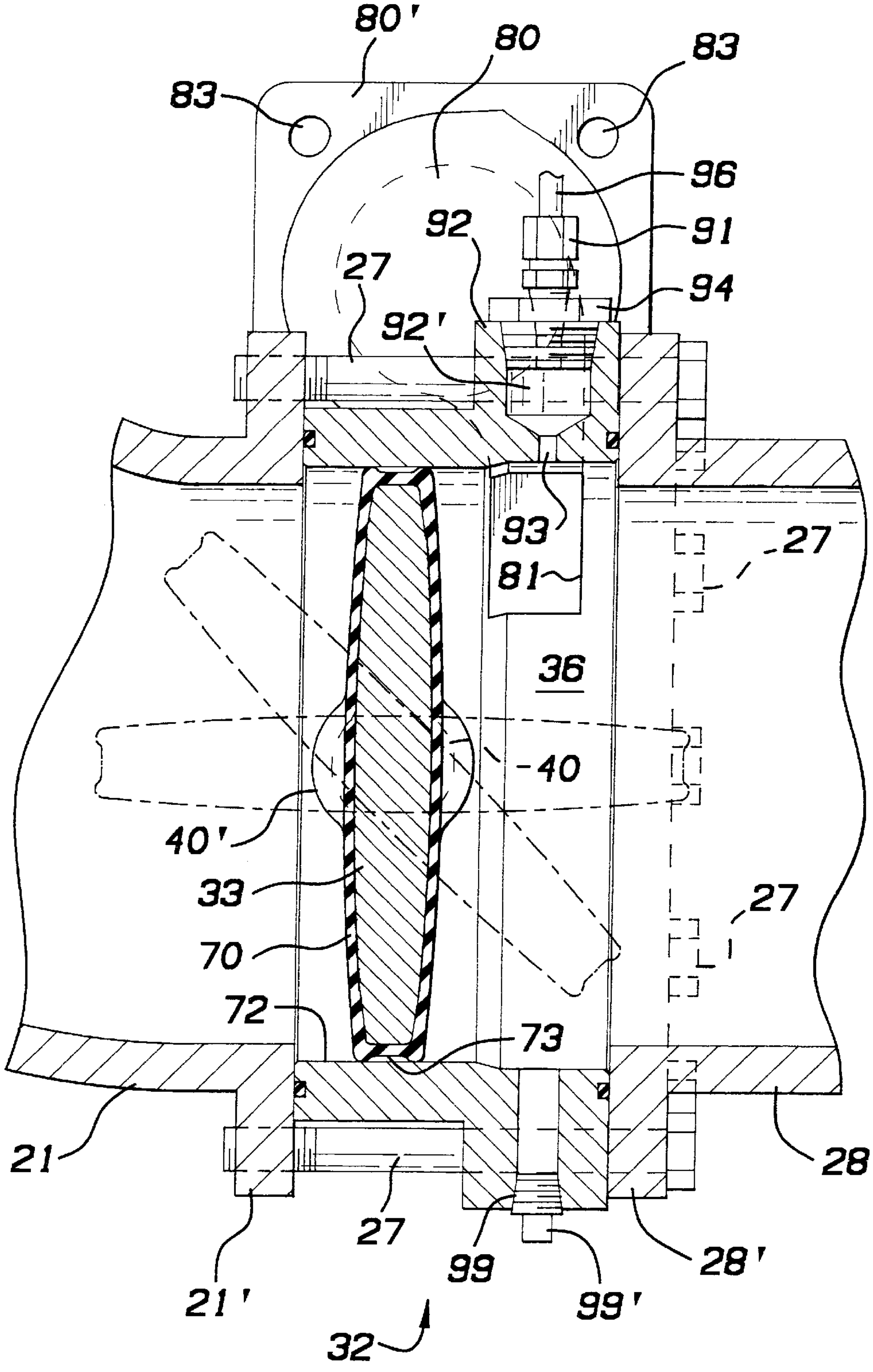
FIG. 5 is a section taken generally on line 5—5 of FIG. 3.

Valve member 33 has an aerodynamic disk-like shape and is made of cast steel coated with a wear resistant, durable nitrile rubber coating 70 formed to provide a positive seal in the closed position of the butterfly valve 32, as best shown in FIG. 5. Valve member 33 has enlarged portions 40' and 44' in the regions surrounding the trunnions 40 and 44, respectively. The circular peripheral edge 73 of valve member 33 cooperates with the cylindrical internal wall 72 defining a downstream portion of valve chamber 36, said wall 72 forming a valve seat against which the peripheral edge 73 of valve member 33 seats in the closed position thereof to provide a positive seal, as shown in solid lines in FIG. 5. Valve member 33 is movable between its vertically extending closed position and an open position shown by the horizontal dashed lines showing valve member 33 in FIG. 5, said movement being through a quarter turn (or 90°). Valve member 33 is also movable to a plurality of partially open positions between said open and closed positions thereof, such as the medial position shown by the slanted dashed lines showing of valve member 33 in FIG. 5. In the closed position of valve member 33, the peripheral edge of coating 70 of valve member 33 compresses somewhat to form a positive seal with the valve seat portion of internal wall 72.

The gear means, i.e., worm gear 58 and segment gear 54, of the valve actuator means 35 are constructed so that about ten turns of handwheel 59 will cause valve member 33 to move between its open and closed positions. The electric motor 60 of the power-operated valve actuator means is constructed to cause valve member 33 to move between its open and closed position in no less than three seconds.

Valve member 33 and valve body 34 are designed to hold a pressure of 600 PSIG so as to exceed the 500 PSIG hydrostatic pressure requirement of the National Fire Protection Association. To this end, the valve member 33 and valve body 34 are constructed to be larger than the corresponding prior valves which are rated to have only a sealing ability of about 250 PSIG.

At the same time, valve member 33 is provided with the aerodynamic disk-like shape in order to provide a minimum obstruction to flow to thereby achieve the least pressure drop as the water flows therethrough to the fire pump. More specifically, the valve member 33 is designed to meet the National Fire Protection Association's requirement of a water flow rate up to 1,500 gallons per minute in order to get all the water through a single 6 inch suction hose from a ten foot lift through 20 feet of hose. None of the prior art valves can achieve this rating on conventional midship pumps.

Valve body 34 is secured in position by being sandwiched between the annular flanges 28' and 21' on suction tube 28 and suction tube extension 21, respectively, by means of ten long screws 27 which extend through holes in flanges 28' to threadedly engage within threaded holes in flange 21', as is shown in the drawings. In this position, valve body 34, and the various assemblies attached thereto are located in a position behind operator panel 22 whereby there is provided an additional amount of safety to the operator in the event of some dangerous rupture or break-up of the various parts of the inlet valve assembly 30 due to an excessive pressure condition. Also, inlet valve assembly 30 is mounted so that it does not interfere with other suction or discharge openings on the fire pump 10 or with pump operating controls.

Figure 3:
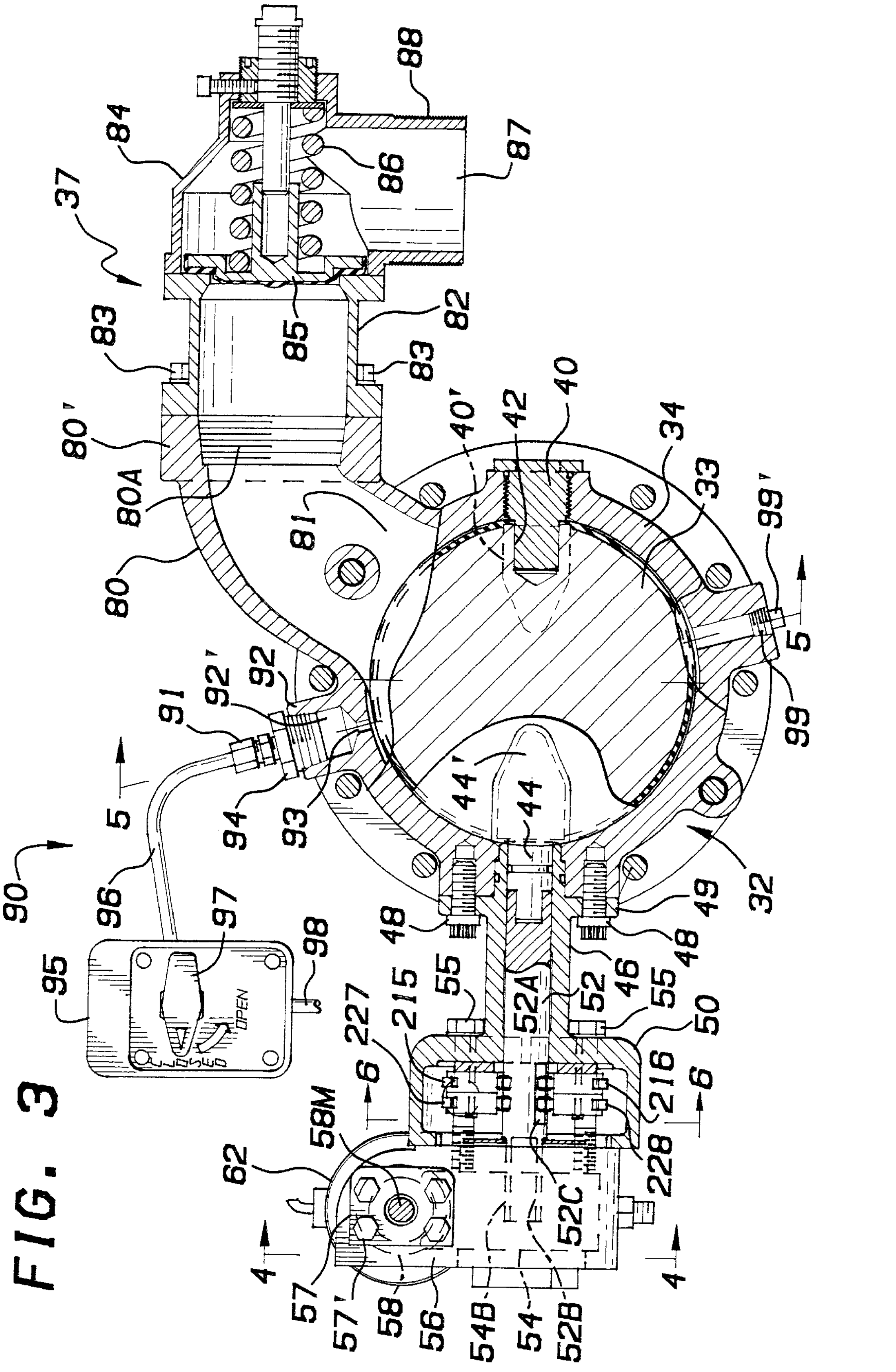
FIG. 3 is a section taken generally on line 3—3 of FIG. 2.

In accordance with the invention, inlet valve assembly 30 is provided a built-in pressure relief valve 37 constructed and arranged to discharge water at a set excessive pressure from valve chamber 36 of butterfly valve 32. Pressure relief valve 37 is constructed and arranged to provide overpressure protection for the suction hose even when valve 32 is closed. To this end, valve body 34 is provided with a hollow, generally arcuate extension 80, which communicates at its inner end, by reason of an arcuate opening 81 in the wall of valve body 34, with a portion of valve chamber 36 upstream of valve member 33. At its outer end, hollow extension 80 provides an integral relief valve mounting pad 80', which has secured thereto, by means of four conventionally arranged mounting screws 83, the inlet tube 82 of a conventional pressure relief valve 37. Relief valve 37 may be of any suitable commercially available type, such as the RELIEF/DUMP VALVE MODEL NO. 40 of ELKHART BRASS MANUFACTURING CO., INC. of Elkhart, Ind. Relief valves of this type are entirely conventional and comprise a valve body 84, a valve member 85 which is biased to a closed position by a coil spring 86, as is shown in FIG. 3. In the event of the occurrence of an excessive water pressure in the upstream portion of valve chamber 36, which pressure will be communicated through extension 80 and inlet tube 82 to the upstream side of the valve member 85, the coil spring 86 will be compressed permitting the valve member 85 to move away from its seat and allow the water to flow therepast and into the dump passage 87 from which the water is discharged, or dumped, to atmosphere. This will serve to relieve the pressure on the upstream side of a closed valve member 33 and prevent damage to the large diameter hose H or valve 32. Typically, pressure relief valve 37 is factory set to 125 PSIG and is field adjustable from 75 to 250 PSIG. Mounting pad 80' is provided with internal female NPT threads 80A to permit remote mounting of relief valve 37 without adapters. The outlet of relief valve 37 is provided with male NPT threads 88 for a pipe connection to allow directing the discharge flow away from the pump operator position.

Means are provided for bleeding air from valve chamber 36 as water is passing thereto from the large diameter hose H connected to the suction tube 28. Such means comprises an air bleed valve assembly 90 which includes a tubular air flow fitting 91 held by a bushing 94, which is threadedly mounted on the outer end of tubular air bleed connection 92 formed in the upper portion of the wall of valve body 34 adjacent extension 80. At the inner end of air bleed connection 92, there is formed a small orifice 93 which communicates with valve chamber 36 at a location upstream of valve member 33 and is sized to control the rate of air flow passing from valve chamber 36 to the interior chamber 92' of air bleed connection 92, which communicates with the upstream end of fitting 91. The downstream end of fitting 91 is connected to a flow control valve 95 by means of a flow tube 96, the downstream end of which is connected to an elbow fitting (not shown) at the inlet of valve 95. Valve 95 is a conventional air bleeder valve and comprises a valve member movable between an open position and a closed position by a handle 97, as is shown in FIG. 3. Valve 95 and handle 97 are mounted on the operator panel 22 so as to be controllable by a pump operator.

When it is desired to bleed air from the valve chamber 36, such as when the water is flowing through the large diameter hose H toward the suction tube 28, the operator moves handle 97 to position valve 95 in its "OPEN" position allowing air to flow from fitting 91, through tube 96 and past the open valve 95 to an exit tube 98 connected to atmosphere. It will be apparent that the rate of this air flow is determined by the size of the flow restricting orifice 93, which is sized to restrict the air flow by an amount such that the contained air cushions the water flow to prevent a water hammer type of effect, the air acting as a shock absorber to the water as it flows through the hose H toward the suction tube 28. Typically, orifice 93 is no larger than ¾ inch in diameter. In use, when the pump operator observes water being discharged through exit tube 98, he moves handle 97 back to the "CLOSED" position and operates the actuation means for butterfly valve 32 to activate the same from its closed to an open flow control position.

Valve body 34 is provided with a ¼ inch female NPT threaded port 99 on the bottom thereof for the connection of an individual water drain valve 99'.

Figure 7:
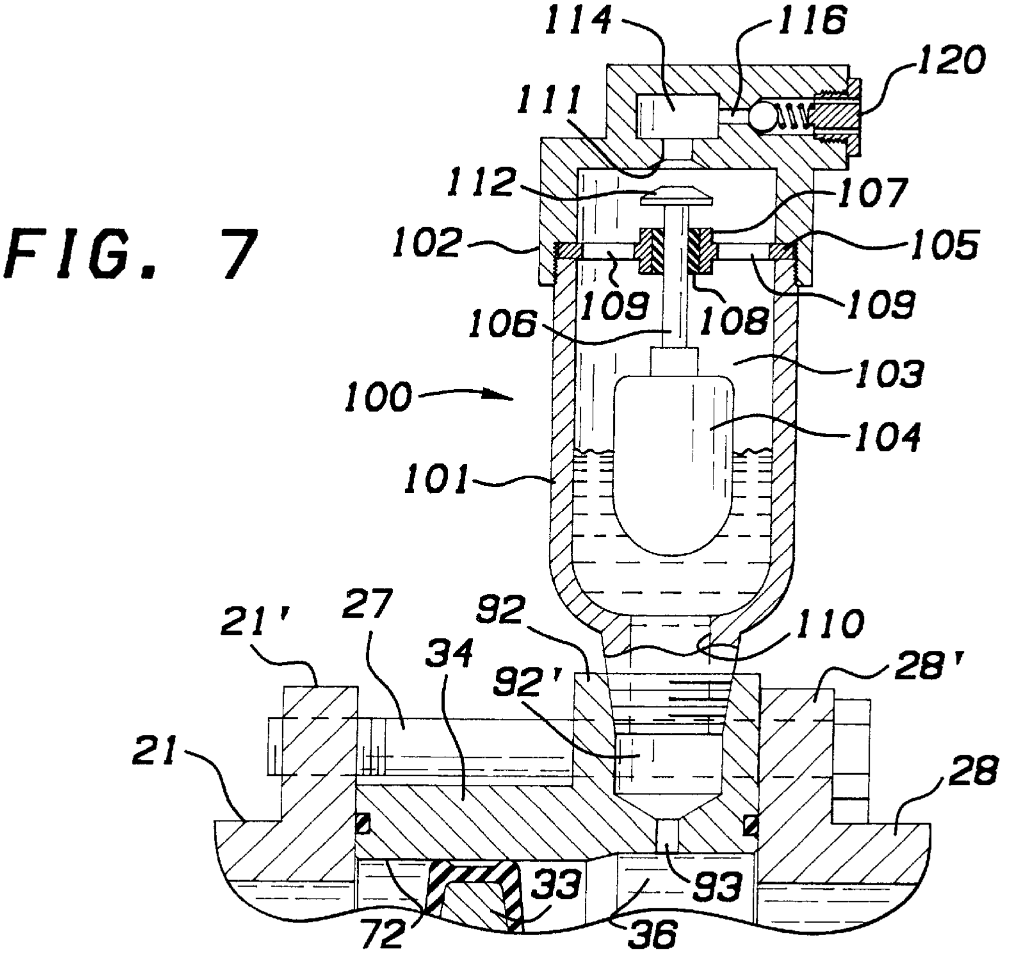
FIG. 7 is a sectional view of an automatic air bleed means for use with the inlet valve in accordance with the invention.

In FIG. 7, there is shown an automatic air bleed means 100 for bleeding air from valve chamber 36 in the same manner as the manually setable air bleed valve assembly 90. Automatic air bleed means 100 comprises a valve body including lower and upper body portions 101 and 102, respectively, which define an internal valve chamber 103. A float 104 is mounted within valve chamber 103 for guided movement vertically by means of a circular plate 105 mounted between body portions 101 and 102 to extend horizontally across valve chamber 103. Plate 105 is constructed and arranged so as to guide a valve stem 106 secured to the upper end of float 104, as shown in FIG. 7. Plate 105 has a central valve guide hub 107 containing a bushing 108 which slidably receives valve stem 106 which has a valve member 112 provided at the upper end thereof. Plate 105 is also provided with a plurality of circular openings 109 therein to provide flow passages for the flow of air as the air passes through valve chamber 103 between an inlet passage 110 at the lower end thereof and the upper end thereof whereat a valve seat 111 is provided. The parts are constructed and arranged so that valve stem 106 is guided within a bushing 108, which is positioned within hub 107, for movement toward and away from the valve seat 111 between an upper closed position blocking flow past the valve seat 111 and out of valve chamber 103 and a lower open position permitting flow past valve seat 111 and through valve chamber 103 to an outlet chamber 114 defined within upper body portion 102.

Outlet chamber 114 is thus arranged at the downstream side of valve seat 111 to receive air flow from valve chamber 103 so long as valve member 112 is in an open position. The air flow is discharged from outlet chamber 114 by way of an outlet passage 116, the discharge end of which cooperates with a ball check valve means 120 which controls flow through the passage 116. Ball check valve means 120 is a conventional spring actuated type of check valve and is constructed and arranged to permit air to flow from chamber 114 through passage 116 to atmosphere but to block flow in the opposite direction. This permits the system to be operated under draft during which a suction pressure is applied to valve chamber 36 and is communicated to the valve chamber 103. In this case, the float 114 will not rise and remain in a lower open position whereby air can flow past valve seat 111. However, the ball check valve 120 prevents any flow of outside air into the system since the spring actuated ball member is biased into contact with the downstream end of passage 116 to prevent the entry of any air into passage 116 and therefore, the air flow is sealed to chamber 103.

In a normal air bleed operation, automatic air bleed means 100 will automatically allow air to bleed from valve chamber 36 so long as there is no water in chamber 103 at a level to raise float 104 upwardly to cause valve member 112 to seal against valve seat 111, i.e., move to its valve closed position. In this case, the air is bled from valve chamber 36 through orifice 93, chamber 92', inlet passage 110 and into valve chamber 103 from which the air flows through valve seat 111, outlet chamber 114, and passage 116. The air flow through passage 116 causes the ball of check valve means 120 to move away from the downstream end thereof by compressing the associated spring thereof, whereupon the air flows through the check valve means 120 to atmosphere.

When valve chamber 36 becomes filled by the water flowing thereto from the large diameter hose H, the water will pass upwardly through orifice 93, chamber 92' and inlet passage 110 into valve chamber 103. As this water flow continues, it will raise to a level such that the float 104 is raised upwardly to cause valve member 112 to contact valve seat 111 to block flow therethrough, whereupon the air bleed operation is terminated.

Figure 8:
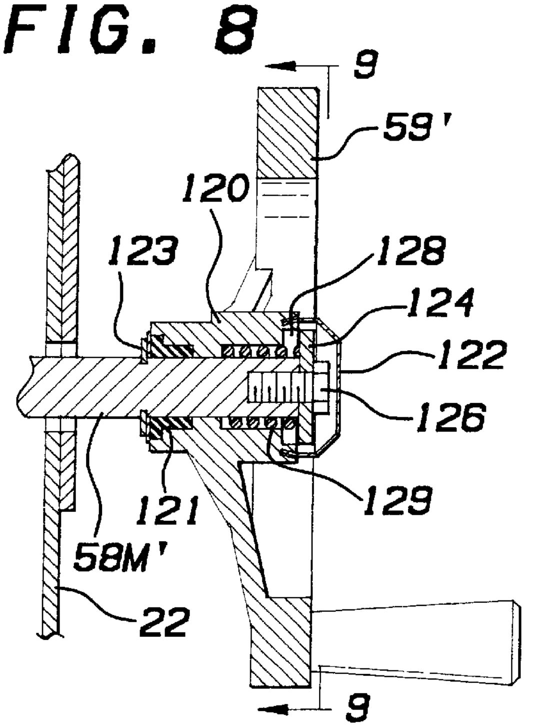
FIG. 8 is a sectional view of a clutchable handle means for use with the controls for the inlet valve in accordance with the invention.
Figure 9:
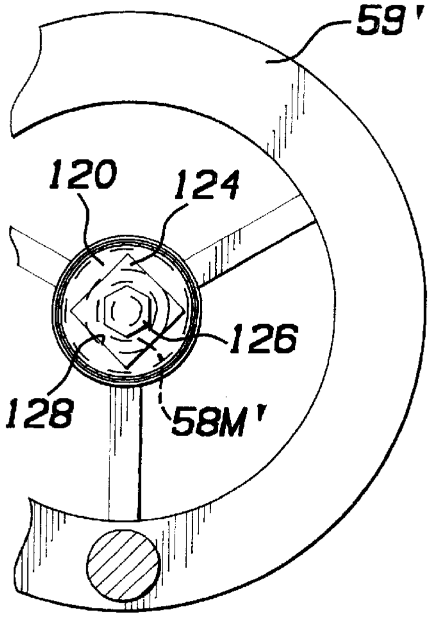
FIG. 9 is a section taken along line 9—9 of FIG. 8.

In FIGS. 8 and 9, there is shown another embodiment of a handwheel for causing rotation of the shaft extension 58M of worm gear 58. In this embodiment, there is provided a clutchable handwheel means comprising a handwheel 59', which is essentially the same as handwheel 59, and is mounted on the end of a shaft extension 58M' which is essentially the same as shaft extension 58M and forms an extended portion of the shaft of worm gear 58. Handwheel 59' is constructed and arranged to be slidably mounted on the end of shaft extension 58M' so as to be movable from a normal, non-engaged position to an activated engaged position. In the non-engaged position of shaft extension 58M' (shown in FIGS. 8 and 9), shaft extension 58M' is free to rotate relative to handwheel 59'. In the engaged position of shaft extension 58M', handwheel 59' which has been pulled outwardly or to the right as shown in FIG. 8, is engaged on the end of shaft extension 58M' for causing conjoint movement of both handwheel 59' and shaft extension 58M' by the manual rotation of handwheel 59'. Means are provided for biasing handwheel 59' to the normal non-engaged position.

Handwheel 59' is slidably mounted on shaft extension 58M' by means of its hub 120 having an internally positioned journal bearing 121 which is supported on the exterior of shaft extension 58M' as shown in FIG. 8. Bearing 121 is contained in a counterbored recess in the inner end of hub 120 and has its internal cylindrical wall slidably and rotatably supported on cylindrical external wall of shaft extension 58M'. An annular retainer clip 123 is secured on the exterior of shaft extension 58M' to contact the inner end of bearing 121 at an inner location to thereby limit the movement of handwheel 59' inwardly. A square-shaped plate 124 is secured on the outer end of shaft extension 58M' by means of a screw 126 and is arranged to limit the outward movement of handwheel 59' on shaft extension 58M'. Plate 124 is arranged to be received in a recess 128 which has a square shape corresponding to that of plate 124. A spring 129 is received in a counterbored portion in the outer end of hub 120 and is arranged in compression between the hub 120 and plate 124 to thereby bias handwheel 59' to its inward or non-engaging position shown in FIG. 8. A dust cover 122 encloses plate 124 and its associated parts.

It will thus be apparent that in FIGS. 8 and 9, there is shown a clutchable handwheel means comprising a handwheel 59' mounted for movement between a position in which it is out of engagement with shaft extension 58M' and a position in which it is in engagement with shaft portion 58M', there being provided means for biasing handwheel 59' to said non-engaged position. By this arrangement, when the operator activates the electric motor to cause rotation of the worm to position the inlet valve, the shaft extension 58M' will rotate relative to the handwheel 59' which will only turn by reason of the occurrence of some frictional drag therebetween. This would avoid the possibility of something getting caught on the rotating handwheel 59'. On the other hand, when it is desired to manually actuate the worm for positioning the valve 32, handwheel 59' is pulled outwardly causing its hub 120 to slide outwardly on the end of shaft extension 58M' to position the plate 124 within the square recess 128, whereby when the handwheel 59' is turned, it will cause a corresponding turning movement of the shaft extension 58M'. When the handwheel 59' is released from the engaged position by the operator, the spring 129 returns the handwheel 59' to the non-engaging position shown in FIG. 8.

Figure 6:
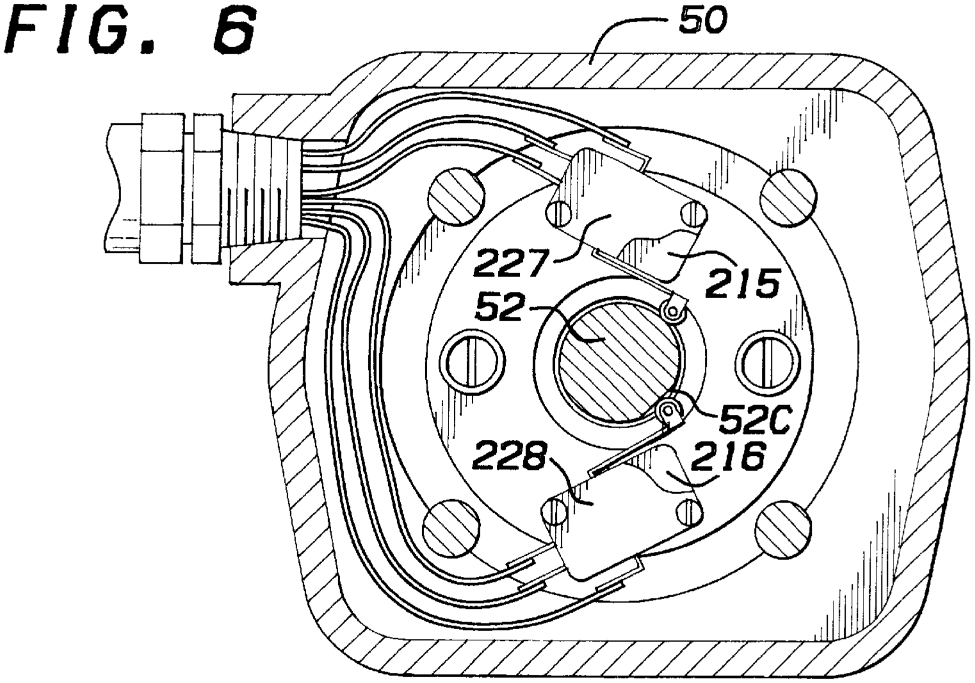
FIG. 6 is a section taken generally on line 6—6 of FIG. 3.
Figure 10:
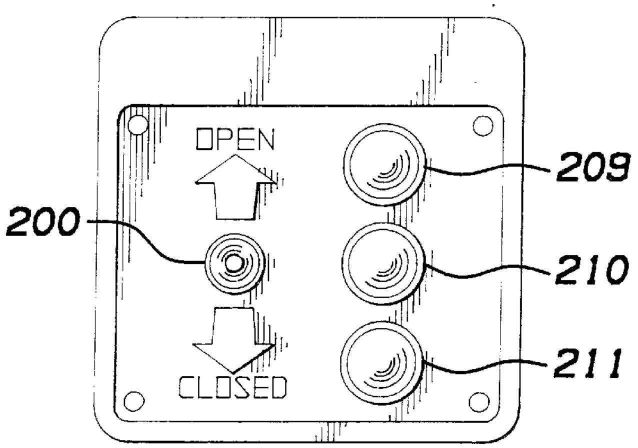
FIG. 10 is a front view of a panel for the status lights for indicating the flow control position of the inlet valve.
Figure 11:
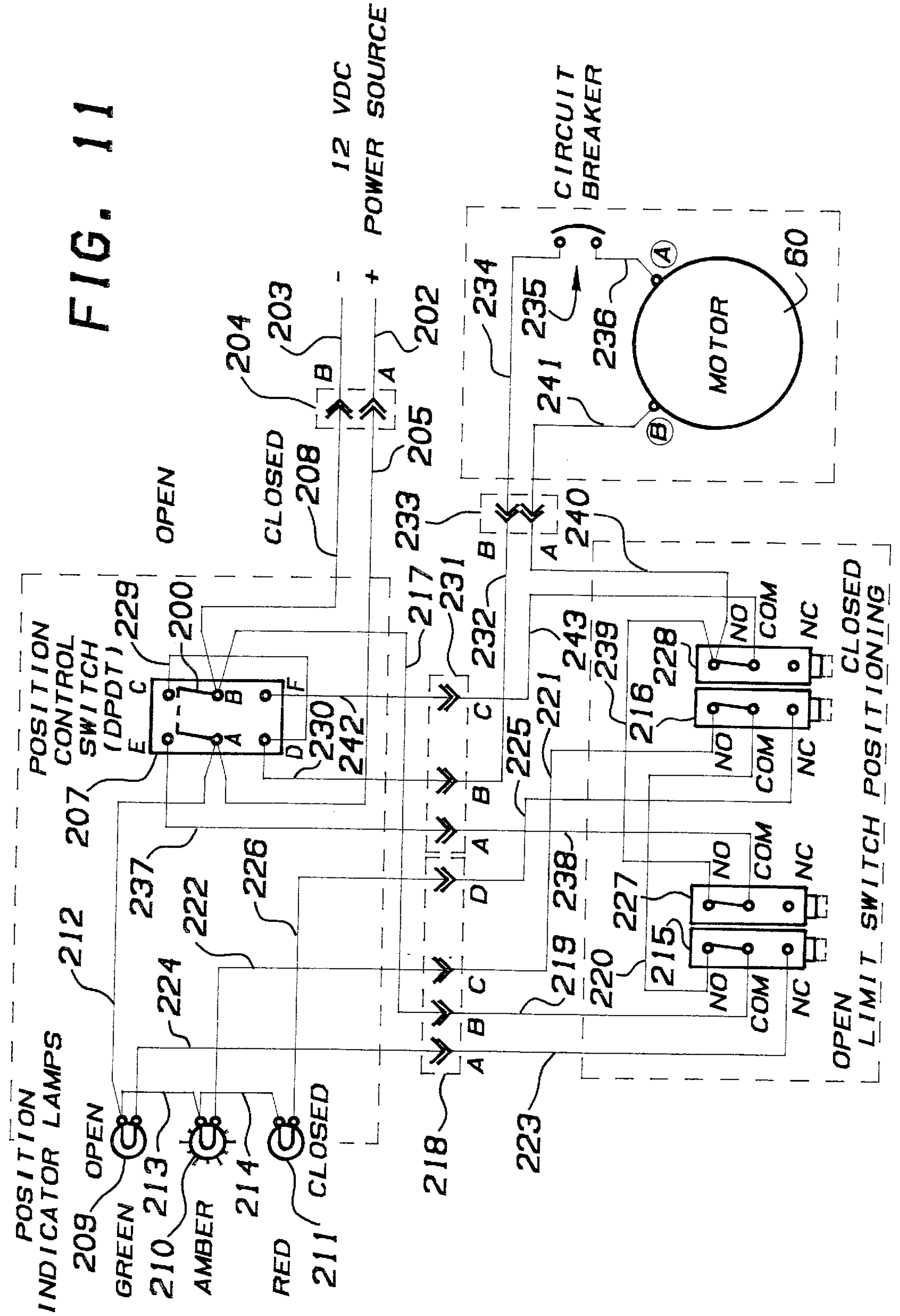
FIG. 11 is a electrical circuit diagram of electrical controls for the inlet valve in accordance with the invention.

In FIG. 11, there is shown a wiring diagram for the electrical control means that controls the operation of the motor 60 and the position indicator lamps 209, 210, and 211, which are of different colors and are mounted on the operator panel in an arrangement as shown in FIG. 10. The electrical control means comprises four position limit switches 215, 216, 227, and 228, which are of a conventional construction, each being movable between a pair of control positions by means of a spring biased roller lever which actuates a switch arm between an outer (open) and an inner (closed) position. As shown in FIGS. 3 and 6, limit switches 215, 216, 227, and 228 are mounted within gear box adapter 50 to cooperate with a corresponding portion of actuator shaft 52 provided with a flat cam surface 52C. Limit switches 215 and 227 and limit switches 216 and 228 are arranged in side-by-side relation. The spring biased roller levers of limit switches 215, 216, 227, and 228 are arranged to contact the cam surface 52C as the actuator shaft 52 is rotated through its one-quarter turn movement as it positions the valve member 33 as discussed above. By this arrangement, the position limit switches 215, 216, 227, and 228 are constructed and arranged to sense the position of the actuator shaft 52 and, accordingly, the position of the valve member 33 as discussed above. In FIG. 11, the limit switches 215, 216, 227, and 228, and their associated parts, are shown in the control position whereby valve member 33 is in an intermediate, or partially open, position, in which case the amber lamp 210 would be lit.

The system power comprises a 12 volt direct current source, which can be provided from a vehicle battery, alternator, or generator power source, and which is shown in the right side of FIG. 11. Power to the system is routed through wires 202 and 203 and an electrical connector 204 having two ports A and B. Port A of connector 204 is the positive voltage port and port B of connector 204 is the negative ground port for the power supply. Positive voltage continues from electrical connector 204 through wire 205 to the middle terminal A of a position control switch 207. The negative ground is carried through wire 208 to the other middle terminal B of position control switch 207. The middle terminals A and B on the position control switch 207, which is double pole double throw (DPDT) switch, are considered to be the "common" terminals thereof.

The operation of the position indicator lamps will now be described.

The positive voltage is supplied to the position indicator lamps 209, 210, and 211 by means of wires 212, 213, and 214. The negative ground is supplied to the position indicator lamps 209, 210, and 211 selectively through the orientation, and therefore the sequence of, the position limit switches 215 and 216. In FIG. 11, the limit switches 215 and 216 are shown in the position corresponding to that shown in FIG. 13B which is the position corresponding to a partially open position of valve member 33. In this condition of the control means the negative ground is routed from the middle terminal B of position control switch 207 to the "COM" (common) terminal of position limit switch 215 through wire 217, port B of a four port electrical connector 218 and wire 219. Because position limit switch 215 is in its closed position, by reason of its switch arm being actuated to its inner position by reason of the contact of the roller lever on the round surface of actuator shaft 52 as shown in FIG. 13B, contact is made between terminals "COM" and "NO" (normally open) thereof. Continuity is made between the "NO" terminal of position limit switch 215 and the "COM" terminal of position limit switch 216 by means of wire 220. Because position limit switch 216 is also in its closed position, as shown in FIG. 13B, contact is made between terminals "COM" and "NO" thereof. The negative ground continues to be routed from the "NO" terminal of position limit switch 216 through wire 221 and port C of four part electrical connector 218 and wire 222 to complete the circuit to the intermediate position lamp 210, whereby said lamp 210 is lit. Lamps 209 and 211 are unlit since there is no completed circuit supplied thereto. Thus, with the amber lamp 210 lit, there is a visual indication to the operator that the valve member 33 is in a partially open position.

Now let it be assumed that the valve member 33 moves from an intermediate position to a fully open position. In this case, the actuator shaft will be moved to a position as shown in FIG. 13C whereby limit switch 215 is moved to an open position wherein its roller lever is in contact with the flat surface 52C of actuator shaft 52 allowing the corresponding switch arm to move to an extended or an outer position. Also, limit switch 216 remains in its closed position because its roller lever is in contact with the round portion of actuator shaft 52 thereby moving the corresponding switch arm to an inner or depressed position. Position limit switch 215 will change orientation when the flat cam surface 52C of actuator shaft 52 allows the spring biased roller lever thereof to extend outwardly breaking the connection between the "NO" terminal and the "COM" terminal of limit switch 215 and making the connection between the "COM" terminal and the "NC" terminal of switch 215. This opens the negative ground circuit to the intermediate position lamp 210 whereby the lamp 210 will go out, and also, closes the negative ground circuit to light the lamp 209 by way of a circuit including wire 223 connected between the "NC" terminal of switch 215 and port A of the four part electrical connector 218 and a wire 224. Position indicator lamp 211 remains in an unlit condition because of the circuit thereto is not complete. Accordingly, the operator is provided with a visual indication that valve member 33 is in its open position.

Now let it be assumed that the valve member 33 moves from an intermediate position to a fully closed position. In this case, the actuator shaft 52 takes the position shown in FIG. 13A, which shows that limit switch 215 is actuated to a closed position, with its switch arm in an inner control position, and limit switch 216 is in an open position, with its switch arm in an outer or extended position by reason of the contact of its roller lever with the flat surface 52C of actuator shaft 52. In this condition of the parts, position limit switch 216 will change orientation when the flat cam surface 52C of actuator shaft 52 allows the spring biased roller lever thereof to extend outwardly breaking the connection between the "NO" terminal and the "COM" terminal of said switch 216 and making the connection between the "COM" terminal and the "NC" terminal thereof. This opens the negative ground circuit of the intermediate position lamp 210 and this lamp will go out, and also closes the negative ground circuit to the closed position indicator lamp 211 by means of a circuit including the wire 225, port D of the four part electrical connector 218, and wire 226. Position indicator lamp 209 is also unlit because of an incompleted electrical circuit thereto. Accordingly, the operator is provided with a visual indication that the valve member 33 is in its fully closed position.

The way in which the electrical control means controls the operation of motor 60 will now be described.

Figure 13A:
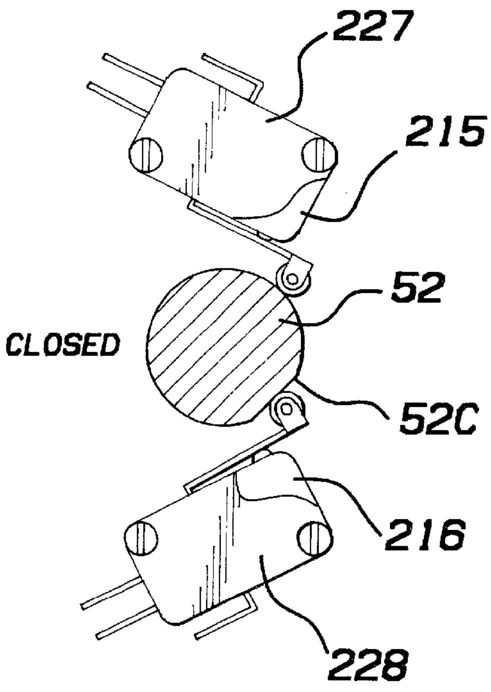
FIG. 13A, 13B, and 13C are views showing three positions of the actuator shaft and associated position limit switches.
Figure 13B:
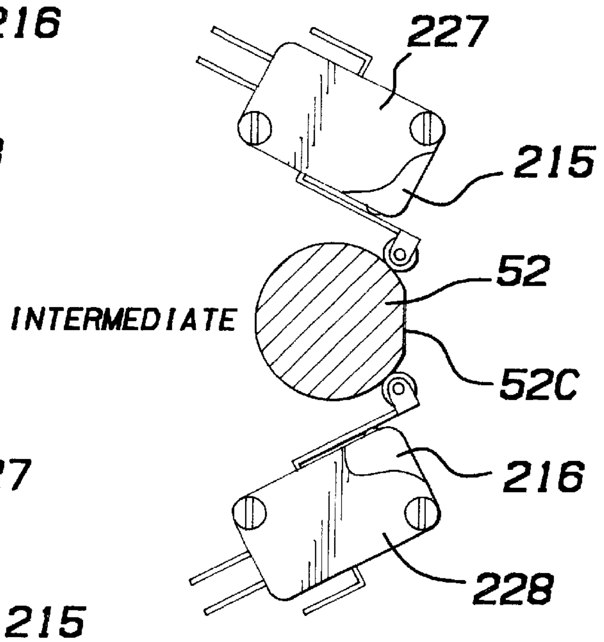
Figure 13C:
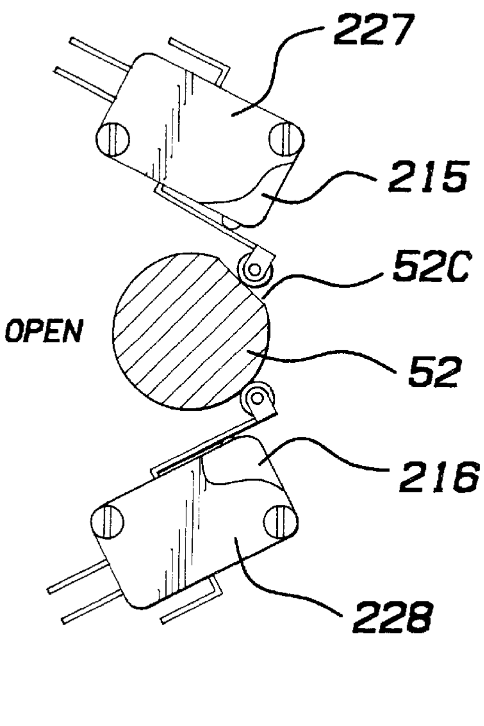

Motor 60 is operatively engaged with actuator shaft 52, through worm gear 58 and segment gear 54 as discussed above, to turn the same one-quarter turn between the positions shown in FIG. 13A and 13B. Motor 60 is a 12 volt direct current electric motor constructed to rotate in either direction in accordance with the polarity orientation of the power supplied to the motor terminals A and B shown in FIG. 11. Thus, the direction of rotation of motor 60 can be reversed by changing the polarity at the motor terminals A and B. This polarity orientation is controlled by the position control switch 207 under the control of its toggle handle 200.

The shut-off of motor 60 is accomplished by one of two methods. One method of shut-off is to simply release the position of the control switch's toggle handle 200, which is a momentary "ON" type of switch. The other method of motor shut-off is for one of the two position limit switches 227 or 228 to change orientation which results in the opening of the circuit and the cutting off of power to the motor 60.

When it is desired to move valve member 33 to its fully open position, the toggle handle 200 of position control switch 207 is moved to the "open" position (i.e., upwardly as shown in FIG. 10). This causes contact to be made between the negative ground terminal B and terminal C of position control switch 207, as is shown in FIG. 11. This causes the negative ground of the power source to be routed from terminal C to terminal D of position control switch 207 by means of wire 229, from which it is routed through a wire 230 and port B of a three port electrical connector 231 and a wire 232 to port B of a two port electrical connector 233 and a wire 234 to a circuit breaker 235 and finally through a wire 236 to terminal A of motor 60. The positioning of the toggle handle 200 to the open position also causes contact to be made between the positive voltage terminal A and terminal E of position control switch 207. Accordingly, the positive voltage of the power source is routed from terminal E of position control switch 207 to the "COM" terminal of position limit switch 227 through wire 237, port A of the three port electrical connector 231 and a wire 238. Because the position limit switch 227 is in its closed control position as shown in FIG. 11, contact is made between terminals "COM" and "NO" of said switch 227. Thus, continuity is made between position limit switch 227 "NO" terminal and position limit switch 228 "NO" terminal via a wire 239. Thus, the positive voltage continues to be routed from the "NO" terminal of position limit switch 228 through a wire 240 to port A of a two port electrical connector 233 and a wire 241 to motor terminal B of motor 60 to thereby complete the circuit to the motor 60 whereby it will rotate the worm gear 58 and segment gear 54 and actuator shaft 52 in the direction to cause the valve member 33 and actuator shaft 52 to be moved to a fully open position as shown in FIG. 13C. As shown in FIG. 13C, the position limit switch 227 will change orientation when the flat cam surface 52C of actuator shaft 52 is contacted by the spring biased roller lever of limit switch 227 whereby the switch arm thereof is moved outwardly to break the connection between the "NO" and the "COM" terminal of said switch 227. This opens the circuit of the motor 60 whereby the motor will stop rotating with the valve in the fully open position.

When it is desired to move the valve member 33 to the closed position, the toggle handle 200 of position control switch 207 is moved to the "closed" position (i.e, downwardly as viewed in FIG. 10). When this is done, contact is made between the positive voltage terminal A and terminal D of position control switch 207. Accordingly, the positive voltage is routed from terminal D of position control switch 207 through wire 230 and port B of three port electrical connector 231 and wire 232 to port B of two port electrical connector 233 and wire 234 to circuit breaker 235 and, finally, through wire 236 to terminal A of motor 60. Movement of toggle handle 200 to the closed position also causes contact to be made between the negative ground terminal B and terminal F of position control switch 207. When this occurs, the negative ground is routed from terminal F of position control switch 207 to the "COM" terminal of position limit switch 228 through wire 242 and port C of three port electrical connector 231 and wire 243. Because position limit switch 228 is closed, contact is made between terminals "COM" and "NO" thereof. Thus, the negative ground continues to be routed from the "NO" terminal of position limit switch 228 through wire 240 and port A of two port electrical connector 233 and wire 241 to motor terminal B of motor 60 to complete the circuit whereby the motor will rotate the worm gear 58 and segment gear 54 and shaft 52 in the direction causing the valve disk to be moved to a fully closed position. When the valve member 33 and shaft 52 have been moved to the fully closed position, (the position shown in FIG. 13A), position limit switch 228 will change orientation when the flat cam surface 52C of shaft 52 allows the spring biased roller lever of switch 228 to extend outwardly thereby breaking the connection between the "NO" terminal and the "COM" terminal of switch 228. This opens the circuit to the motor 60 and the motor 60 will stop rotating with the parts in the valve closed position.

Figure 12:
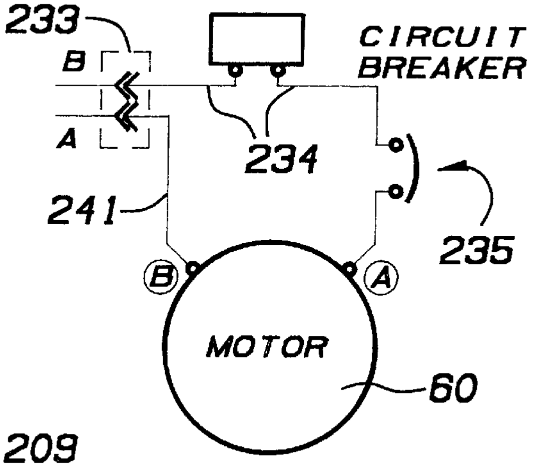
FIG. 12 is a view showing an alternate motor control circuit.

In FIG. 12, there is shown a modified form of power supply circuit for motor 60, which circuit comprises a flasher unit wired into the motor wiring circuit to provide a momentary interruption of the current flow to the motor 60. As shown in FIG. 12, the flasher unit is connected in series in the wire 234 connected between electrical connector 233 and the circuit breaker 235. The flasher unit is a standard heavy duty automotive type vehicular turn signal or hazard warning signal flasher. By the arrangement shown in FIG. 12, the flasher unit can enhance the performance of the inlet valve 32 in accordance with the invention by slowing the opening and closing time thereof so as to reduce the effects of water hammer impact on the valve. More specifically, depending on the flasher characteristics, the opening and closing time can be more than doubled. Also, the performance of the valve can be improved by pulsing the motor 60 ON and OFF with the flasher unit, which is particularly helpful when the valve member 33 becomes stuck in its closed position (which can happen as a consequence of little or no lubrication or of surface ice). This pulsing subjects the motor 60 to a series of short intervals of high in-rush currents resulting in a series of high torque pulsed to overcome a stalled condition.

It will be apparent that the butterfly valve and associated controls provided in accordance with the invention have several advantageous features. Thus, the arrangement whereby the inlet valve is designed to fit behind the pump operator panel and is usable with a large diameter hose provides an important safety feature. Furthermore, the oversized and streamlined butterfly disk design allows the inlet valve assembly to remain in place during high volume draft operations, which is not the case with the prior art valves which restrict the flow and cause cavitation. This means that the inlet valve assembly in accordance with the invention can remain in place while the apparatus is undergoing NFPA/UL certification for water flows for up to 1500 GPM with a single suction hose. The valve does not have to be removed and replaced with each NFPA/UL certification test leaving less chance for causing leaks or damage to the valve components.

The electric motor operation whereby the motor is operated from a remote located control switch provides for additional safety and flexibility. Moreover, the provision of a panel mounted manual override handwheel that permits operation of the valve during abnormal conditions provides for flexibility and safety. This means requires no special tools or partial disassembly of the valve to make emergency operation possible.

Also, the design whereby the manual handwheel operated valve will cycle from full closed to full open position using just ten turns of a handwheel provides for efficient operation.

Another advantageous feature is the design of the gear actuator whereby the valve can be cycled by operation of the electrical motor from full closed to full open position in not less than three seconds.

Another feature is the provision of a built-in pressure relief valve for dumping water from the upstream side of the valve member at a convenient location.

The above and other features of the invention are described in more detail hereinbefore and it will be apparent to those skilled in the art that while particular embodiments of the invention have been illustrated and described herein, it is not intended to limit the invention to such disclosure and changes and modifications may be made.

What is claimed is:

1. An inlet valve of a butterfly valve construction for controlling the flow of water from a large diameter fire hose to the suction of a fire pump mounted on the chassis of a fire truck wherein a suction tube extension is arranged to be connected to the suction of the fire pump and a suction tube is arranged to extend outwardly of an operator panel on the side of the fire truck for connection to the large diameter hose, said inlet valve comprising a valve body mounted between said suction tube and said suction tube extension and behind said operator panel, said valve body being constructed and arranged to define an internal valve chamber in flow communication between said suction tube and said suction tube extension, a valve seat located within said valve chamber, and a valve member cooperable with said valve seat to control the flow through said valve chamber between said suction tube and said suction tube extension, said valve member being movable between a plurality of flow control positions including a fully open position, a plurality of partially open positions and a fully closed position, and manually operable means for actuating said valve member to said flow control positions thereof.

2. An inlet valve according to claim 1 wherein said inlet valve comprises a gear actuator mechanism operatively connected to said valve member for causing movement thereof between said flow control positions, said gear actuating mechanism comprising a gear set comprising a worm gear and a worm wheel gear.

3. An inlet valve according to claim 1 including power operated means for actuating said valve member to said flow control positions thereof.

4. An inlet valve according to claim 3 wherein said power operated means for actuating said inlet member comprises an electric motor and means for controlling the operation of said electric motor from a location remote from said valve body.

5. An inlet valve according to claim 4 comprising a gear actuator mechanism operatively connected to said valve member for causing movement thereof between said flow control positions, said gear actuating mechanism comprising a gear set comprising a worm gear and a worm wheel gear.

6. An inlet valve according to claim 5 wherein said manually operable means for actuating said inlet valve comprises a first shaft portion extending in a first direction from said worm gear to a location in front of said operator panel and including a handle engaged with said first shaft portion at said location in front of said operator panel, and wherein said power-operated means for actuating said inlet valve comprises a second shaft portion extending from said worm gear in a direction opposite to said first direction to a location behind said operator panel, said electric motor being operatively engaged with said second shaft portion at said location behind said operator panel.

7. An inlet valve according to claim 1 comprising a pressure relief valve mounted on said inlet valve body and constructed and arranged to communicate with said internal valve chamber at a location upstream of said valve member to discharge water therefrom in response to the occurrence of an excessive water pressure condition therein.

8. An inlet valve according to claim 7 comprising an air bleed means mounted on said inlet valve body and constructed and arranged to communicate with said internal valve chamber at a location upstream of said valve member, said air bleed means being movable between a closed position blocking the flow of air from said internal valve chamber to atmosphere and an open position permitting a flow of air from said internal valve chamber to atmosphere for bleeding air from the upstream side of said inlet valve.

9. An inlet valve according to claim 1 wherein said valve member is disk-shaped, said valve member and said valve body being constructed and arranged to withstand a hydrostatic pressure of 600 PSIG.

10. An inlet valve according to claim 1 wherein said valve member is disk-shaped and is constructed and arranged to provide a minimum obstruction to flow to thereby achieve a minimum pressure drop as the water flows through said inlet valve to the fire pump.

11. An inlet valve according to claim 1 including electrically operable means for indicating the flow control position of said valve member including three lights of different colors mounted on the operator panel at a location to be visible to the operator during operation of the inlet valve, a first of said lights providing indication of the valve closed position, a second of said lights providing an indication of the valve open position, and a third one of said lights providing an indication of a partially open valve position.

12. An inlet valve according to claim 3 wherein said manually operable means for actuating said inlet valve comprises a first shaft portion extending from said worm gear to a location in front of said operator panel, a handle mounted on said first shaft portion at said location, said handle being mounted on said first shaft portion for movement between a first position out of driving engagement with said first shaft portion and a second position in driving engagement with said first shaft portion, and including means for biasing said handle to said first position thereof.

13. An inlet valve according to claim 5 wherein said electric motor is constructed and arranged to operate at a speed to actuate said shaft portion at a rate that causes the valve member to move between said open and closed flow control positions at a predetermined time period.

14. An inlet valve according to claim 1 comprising an air bleed means mounted on said inlet valve body and constructed and arranged to communicate with said internal valve chamber at a location upstream of said valve member and to be movable between an open position permitting the flow of air from said valve chamber to atmosphere for bleeding air from said internal valve chamber and a closed position blocking the flow of air from said internal valve chamber to atmosphere, said air bleed means including a float mounted in said air bleed means to be responsive to the accumulation of water therein to actuate said air bleed means to said closed position thereof.

15. An inlet valve of a butterfly valve construction for controlling the flow of water from a large diameter fire hose to the suction of a fire pump mounted on the chassis of a fire truck wherein a suction tube extension is arranged to be connected to the suction of the fire pump, said inlet valve being located behind an operator panel on the side of the fire truck, said inlet valve comprising a valve body mounted between said suction tube and said suction tube extension and behind said operator panel, said valve body being constructed and arranged to define an internal valve chamber in flow communication between said suction tube and said suction tube extension, a valve seat located within said valve chamber, and a valve member cooperable with said valve seat to control the flow through said valve chamber between said suction tube and said suction tube extension, said valve member being movable between a plurality of flow control positions including a fully open position, a plurality of partially open positions and a fully closed position, and power-operated means for actuating said valve member to said flow control positions thereof.

16. An inlet valve according to claim 15 wherein said power-operated means for actuating said valve member comprises an electric motor and means for controlling the operation of said electric motor from a location remote from said valve body.

17. An inlet valve according to claim 16 comprising a gear actuator mechanism operatively connected to said valve member for causing movement thereof between said flow control positions, said gear actuating mechanism comprising a gear set comprising a worm gear and a worm wheel gear.

18. An inlet valve according to claim 15 comprising a pressure relief valve mounted on said inlet valve body and constructed and arranged to communicate with said internal valve chamber at a location upstream of said valve member to discharge water therefrom in response to the occurrence of an excessive water pressure condition therein.

19. An inlet valve according to claim 18 comprising an air bleed means mounted on said inlet valve body and constructed and arranged to communicate with said internal valve chamber at a location upstream of said valve member, said air bleed means being movable between a closed position blocking the flow of air from said internal valve chamber to atmosphere and an open position permitting a flow of air from said internal valve chamber to atmosphere for bleeding air from the upstream side of said inlet valve.

20. An inlet valve according to claim 16 comprising a power supply circuit for connecting said motor to a source of power, said power supply circuit comprising a flasher unit serially connected therein for providing a momentary interruption of the current flow to said motor.

21. An inlet valve according to claim 15 wherein said power-operated means for actuating said valve member to said flow control positions thereof comprises a reversible electric motor having a rotatable motor shaft, said motor being constructed and arranged to cause rotation of said motor shaft in either direction in response to the polarity of the electric current supplied thereto, means for controlling operation of said electric motor, and means operatively engaged between said motor shaft and said valve member for causing movement of the valve member including a rotatable actuator shaft, said means for controlling operation of said electric motor comprising means constructed and arranged to sense the position of said actuator shaft.

22. An inlet valve according to claim 21 wherein said means for sensing the position of said actuator shaft comprises a plurality of limit switches cooperable with a cam surface on said actuator shaft.

23. A butterfly inlet valve assembly for controlling the flow of water from a large diameter fire hose to the suction of a fire pump mounted on the chassis of a fire truck behind the operator panel, said assembly comprising a suction tube extension connected to the pump, a suction tube extending outwardly from behind said operator panel for connection to a large diameter hose, and an inlet valve mounted between said suction tube and said suction tube extension and behind said operator panel, said inlet valve comprising:

a valve body mounted between said suction tube and said suction tube extension and behind said operator panel, said valve body being constructed and arranged to define an internal valve chamber in flow communication between said suction tube and said suction tube extension, a valve seat located within said valve chamber, and a valve member cooperable with said valve seat to control the flow through said valve chamber between said suction tube and said suction tube extension, said valve member being movable between a plurality of control positions including a fully open position, a plurality of partially open positions and a fully closed position, a pressure relief valve constructed and arranged to communicate with said internal valve chamber at a location upstream of said valve member to discharge water therefrom in response to the occurrence of an excessive water pressure condition therein, and means for actuating said valve member to said flow control positions thereof, said valve assembly constructed and arranged so that only said suction tube is located on the outside of said operator panel when said valve assembly is connected to said pump.

24. The valve assembly recited in claim 23, including a gear actuator mechanism operatively connected to said valve member for causing movement thereof between said flow control positions, said gear actuating mechanism comprising a gear set having a worm gear and a worm gear wheel.

25. The valve assembly recited in claim 23, including power means for actuating said valve member to said flow control positions.

26. The valve assembly recited in claim 23, including manual means for actuating said valve member to said flow control positions, said maual means being operable from the outside of said operator panel.

27. The valve assembly recited in claim 25, said power means including means for controlling the operation of said power means from a location remote from said valve body.

28. The valve assembly recited in claim 23, including both power means and manual means for actuatin said valve member to said flow control positions.

29. The valve assembly recited in claim 23, including an air bleed means constructed and arranged to communicate with said internal valve chamber at a location upstream of said valve member, said air bleed means being movable between a closed position blocking the flow of air from said internal valve chamber to atmosphere and an open position permitting a flow of air from said internal valve chamber to atmosphere for bleeding air from the upstream side of said inlet valve.

30. The valve assembly recited in claim 23, wherein said valve member is disk-shaped, said valve member and said valve body being constructed and arranged to withstand a hydrostatic pressure of 600 PSIG.

31. The valve assembly recited in claim 23, wherein said valve member is disk shaped and is constructed and arranged to provide a minimum obstruction to flow and to maintain the N.F.P.A rating of the pumb when installed on the pump.

32. The valve assembly recited in claim 23, including means for indicating the flow control position of said valve member.

33. The valve assembly recited in claim 23, wherein said actuating means is constructed and arranged to operate at a controlled speed between open and closed positions to prevent formation of a water hammer or shock in a hose connected to the pump.

34. A butterfly inlet valve assembly for controlling the flow of water from a large diameter fire hose to the suction of a fire pump mounted on the chassis of a fire truck behind the operator panel, said assembly comprising a suction tube extension connected to the pump, a suction tube extending outwardly from behind said operator panel for connection to a large diameter hose, and an inlet valve mounted between said suction tube and said suction tube extension and behind said operator panel, said inlet valve comprising:

a valve body mounted between said suction tube and said suction tube extension and behind said operator panel, said valve body being constructed and arranged to define an internal valve chamber in flow communication between said suction tube and said suction tube extension, a valve seat located within said valve chamber, and a valve member cooperable with said valve seat to control the flow through said valve chamber between said suction tube and said suction tube extension, said valve member being movable between control positions, a pressure relief valve constructed and arranged to communicate with said internal valve chamber at a location upstream of said valve member to discharge water therefrom in response to the occurrence of an excessive water pressure condition therein, and means for actuating said valve member to said flow control positions thereof, said valve assembly constructed and arranged so that only said suction tube is located on the outside of said operator panel when said valve assembly is connected to said pump.

35. The valve assembly recited in claim 34, including a gear actuator mechanism operatively connected to said valve member for causing movement thereof between said flow control positions, said gear actuating mechanism comprising a gear set having a worm gear and a worm gear wheel.

36. The valve assembly recited in claim 34, including power means for actuating said valve member to said flow control positions.

37. The valve assembly recited in claim 34, including manual means for actuating said valve member to said flow control positions, said maual means being operable from the outside of said operator panel.

38. The valve assembly recited in claim 36, said power means including means for controlling the operation of said power means from a location remote from said valve body.

39. The valve assembly recited in claim 34, including both power means and manual means for actuatin said valve member to said flow control positions.

40. The valve assembly recited in claim 34, including an air bleed means constructed and arranged to communicate with said internal valve chamber at a location upstream of said valve member, said air bleed means being movable between a closed position blocking the flow of air from said internal valve chamber to atmosphere and an open position permitting a flow of air from said internal valve chamber to atmosphere for bleeding air from the upstream side of said inlet valve.

41. The valve assembly recited in claim 34, wherein said valve member is disk-shaped, said valve member and said valve body being constructed and arranged to withstand a hydrostatic pressure of 600 PSIG.

42. The valve assembly recited in claim 34, wherein said valve member is disk shaped and is constructed and arranged to provide a minimum obstruction to flow and to maintain the N.F.P.A rating of the pumb when installed on the pump.

43. The valve assembly recited in claim 34, including means for indicating the flow control position of said valve member.

44. The valve assembly recited in claim 34, wherein said actuating means is constructed and arranged to operate at a controlled speed between open and closed positions to prevent formation of a water hammer or shock in a hose connected to the pump.

* * * * *